April 28, 1970 W. J. GOETTSCH 3,508,460
PAPERBOARD SLITTING DEVICE
Filed Feb. 16, 1968

INVENTOR
WALTER J. GOETTSCH
BY
ATTORNEYS

United States Patent Office 3,508,460
Patented Apr. 28, 1970

3,508,460
PAPERBOARD SLITTING DEVICE
Walter J. Goettsch, Kenilworth, Ill., assignor to The Langston Company, Camden, N.J., a corporation of New Jersey
Filed Feb. 16, 1968, Ser. No. 706,179
Int. Cl. B23d 19/00, 45/00
U.S. Cl. 83—56         5 Claims

ABSTRACT OF THE DISCLOSURE

Corrugated paperboard is slit by a rotating blade having a serrated edge while the paperboard is supported by a full face rotating brush roll. Both the blade and the brush roll rotate with surface speeds exceeding board speed.

---

In the manufacture of corrugated paperboard, it is conventional to make wide board and then longitudinally slit the paperboard into webs of the desired width. In a subsequent operation, the webs are cut to unit lengths by a cut-off knife. Heretofore, sliting has been accomplished by means of a rotating blade on one shaft, and a mating die or blade on a parallel shaft. It is mandatory that the blades run dead true and that their opposed edges be in juxtaposition to insure a good cut. Because of the need to have opposing blades in contact, the pressure between them may vary so that nicking and premature wear of the cutting edge is common.

In accordance with the present invention, the paperboard is cut by a rotating blade having a serrated edge while the paperboard is supported by a full face rotatable brush roll. Thus, the present invention contemplates slitting paperboard while using only one blade without any mating die, blade, or anvil. By using a full face brush instead of a mating die, blade or anvil to support the corrugated paperboard and cooperate with the upper blade, various disadvantages of the prior art are overcome.

The slitting attained by the present invention is consistently of superior quality in that the slit edge is absolutely square, clean, and without any crush or edge damage such as "crow's-feet." This superior quality is especially pronounced when slitting double-wall and triple-wall corrugated paperboard. The edges are crushed or damaged since they are not fed between a blade and a mating die or anvil wherein the corrugated paperboard structure is crushed and the edges of the outer liners generally intermittently torn before the shearing function of the slitter is accomplished.

The present invention avoids prior problems resulting in a loose edge caused by disturbing the adhesive bond between the liners and the corrugated member when running with stiff liners or on multiple structures such as double wall or triple wall at speeds approaching the bonding capacity of a double-facer. The amount of dust, commonly referred to as "fuzz" produced by the slitting operation of the present invention is minimal.

Heretofore, it was conventional to use a slitting blade and a mating die or anvil, each of which are adjustable along their respective shafts. Each time the width of the board to be slit was changed, the location of the blade and anvil or die had to be correspondingly changed. Because the present invention utilizes only a single cutting member and only this member is moved when changing the set-up, labor and set-up time are greatly reduced and only nominal skill is required. The previous method of setting two blades in juxtaposition required excessive precison in manufacture of the components and in setting them on their respective shafts to cut properly. If runout occurred the resulting interference induced critical loads on components of the driving mechanism and waste of applied power.

It is an object of the present invention to provide novel apparatus and method for slitting corrugated paperboard.

It is another object of the present invention to provide novel apparatus and method for slitting corrugated paperboard which produces a superior quality of cut while at the same time substantially reduces set-up time.

It is another object of the present invention to provide slitting structure which is easier to automate.

It is another object of the present invention to provide novel apparatus and method for slitting corrugated paperboard which does not use an anvil or die.

It is another object of the present invention to provide novel apparatus and method for slitting corrugated paperboard utilizing a serrated blade and rotatable brush roll.

It is another object of the present invention to provide novel apparatus and method for slitting corrugated paperboard which does not crush the edge of the board where the cut is being made and eliminates the tendency of tears on the liners, commonly called "crow's feet."

Other objects will appear hereinafter.

For the purpose of illustrating the invention, there are shown in the drawings forms which are presently preferred; it being understood, however, that this invention is not limited to the precise arrangements and instrumentalities shown.

Figure 1:
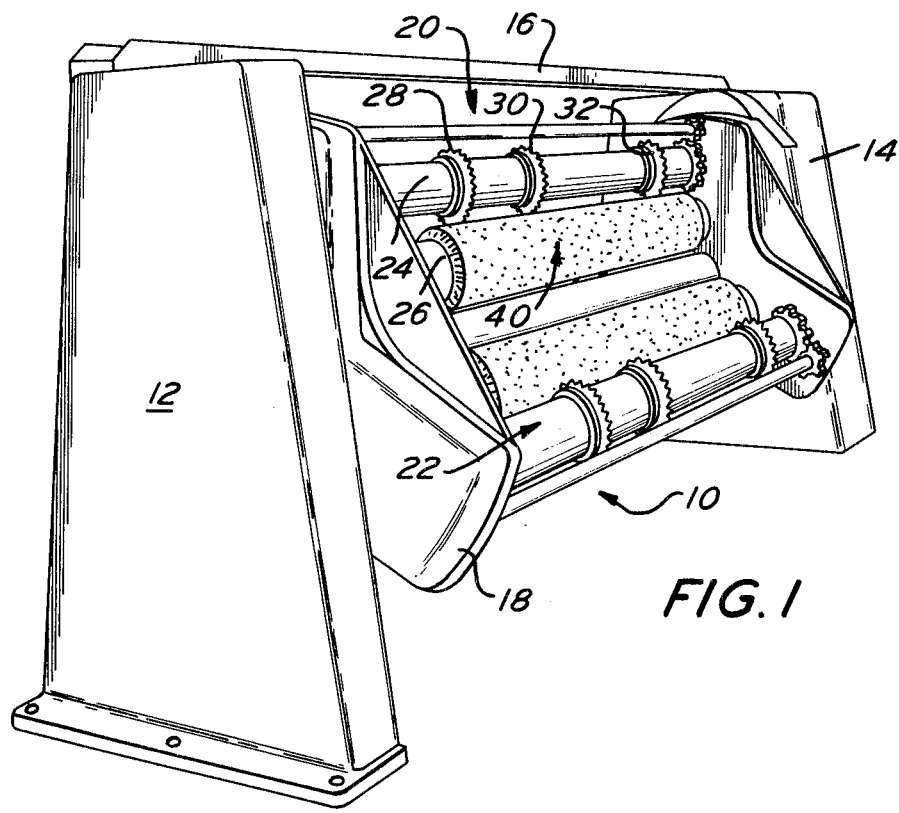
FIGURE 1 is a perspective view of a slitter in accordance with the present invention.

Referring to the drawing in detail, wherein like numerals indicate like elements, there is shown in FIGURE 1 a paperboard slitter designated generally as 10. The slitter 10 includes end frames 12 and 14 interconnected by a brace 16. The end frames 12 and 14 support one or more slitting stations.

As illustrated, the slitter 10 includes a rotary unit 18 having three slitting stations. Only slitting stations 20 and 22 are illustrated. The principles of the present invention are adapted for use in a slitter having single or multiple slitting stations. Hence, the illustration of a slitter having triple slitting stations only one of which is in operative position is for purposes of illustration only.

The operative slitting station, namely station 20, includes parallel rotatable shafts 24 and 26. A plurality of slitting units 28, 30 and 32, are supported by shaft 24 and rotate therewith. When station 20 is in an inoperative position, the units may be moved to any desired position along shaft 24. The number of slitting units on shaft 24 is determined by the number of cuts to be made in the paperboard. For the purposes of the present disclosure, it is assumed that the board is to be trimmed along its longitudinal edges by units 28 and 32 and slit longitudinally by unit 30 into two separate webs.

Figure 2:
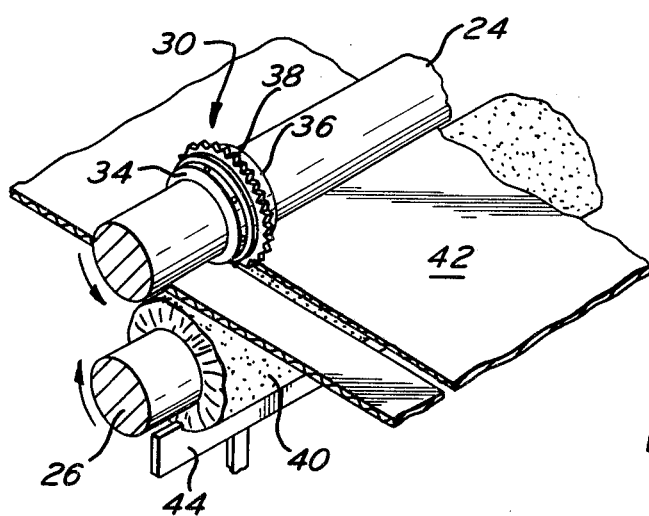
FIGURE 2 is a partial perspective view on an enlarged scale of the rotating blade and mating full face brush in accordance with the present invention.

Each of the slitting units 28–32 are identical. As shown more clearly in FIGURE 2, slitting unit 30 comprises a pair of collars or hubs 34 and 36 adapted to be fixedly secured to the shaft 24 at spaced points therealong by use of screws or bolts. A cutting blade 38 is fixedly secured to the hubs 34 and 36. All of the above structure is conventional.

In accordance with the present invention, the cutting blade 38 is provided with a serrated edge. The blades 38 which have given excellent performance at a diameter of 9.062 inches, were .058 inch thick, has a center bevel, and were made from 440–A stainless steel 52 Rockwell–SK–108. Shaft 24 and blade 38 are rotated so that blade 38 has a surface speed between 200 percent and 360 percent of the speed of the web of corrugated paperboard 42.

A brush roll 40 is fixedly secured to shaft 26 and extends across the full width of adjustment of the blades on the slitting units 28–32. Brush roll 40 is preferably made from stiff nylon bristles having a length of about ⅝ of an inch. The bristles preferably have a diameter of about .020 inch so as to be sufficiently stiff to support the web of paperboard 42 with a small amount of deflection. Such flexure of the bristles is desired since contaminants such as fuzz imparted to the brush are automatically deflected as the brush roll rotates thereby making the brush roll 40 self-cleaning. Brush roll 40 is rotated so as to have a surface speed of approximately 103 percent of the speed of the corrugated web of paperboard 42. If desired, a doctor bar 44 may be provided which flexes the bristles on the brush roll 40 to eliminate any tendency for the formation of grooves in the brush roll where the blade 38 enters the same and to flex out any accumulated dust.

I have found that the optimum size and shape for the serrations of the blade 38 are as follows:

The serrations are approximately 3/32 of an inch with the shape of the serration being V-shaped and approximately 3/32 of an inch deep. The cutting edge of the teeth should in all cases be on the center of the blade and not offset as is the case with circular saw blades. By having the cutting edge of the teeth on the center of the blade, the dust problem is minimized. Thus, the serrated edge on the blades 38 is an interrupted edge as opposed to a continuous edge. A blade edge which is interrupted operates with a smaller downward pressure and gives a very clean square cut in the paperboard. The amount which the blade penetrates the periphery of the brush roll 40 may be varied as desired. Good results have been attained where the penetration is ⅛ to 3/16 of an inch. Notwithstanding the penetration of the blade in the brush, no evidence of bristle attrition was noted.

As used herein, a brush roll is a roll having a solid or hollow core with generally radial bristles on its outer periphery. A "full face" brush roll is one wherein the core has bristles along its entire operative length. The operative length of the roll is generally equal to or slightly wider than the maximum width paperboard which can be processed by the machine. The present invention may be used where the slitting blades are driven by separate laterally adjustable motors rather than by a motor connected to a common shaft for all of the blades as described above.

The present invention may be embodied in other specific forms without departing from the spirit or essential attributes thereof and, accordingly, reference should be made to the appended claims, rather than to the foregoing specification as indicating the scope of the invention.

I claim:
1. A method of slitting corrugated paperboard comprising the steps of slitting the paperboard using a rotating blade having a serrated edge while supporting the paperboard by a rotating brush roll, rotating the brush roll at a speed slightly greater than the speed of the movement of the paperboard and rotating the blade at a yet higher speed, and using a brush roll whose bristles are stiff and have an interference fit with the cutting edge on said blade.

2. Apparatus comprising a shaft, a plurality of serrated edge blades supported by said shaft at spaced points therealong, a brush roll supported for rotation about an axis parallel to and below the axis of rotation of said shaft, each blade being juxtaposed to a portion of the periphery of said brush roll, said brush roll having stiff bristles along its entire operative length, said roll being positioned so that the bristles have an interference fit with the cutting edge of said blades so that corrugated paperboard may be cut as it passes between the brush roll and the blades.

3. Apparatus in accordance with claim 2 wherein said brush roll has nylon bristles, said bristles having a length of approximately ⅝ of an inch, and the diameter of said bristles being approximately .020 inch.

4. Apparatus in accordance with claim 2 including a doctor bar engaging said bristles to cause said bristles to flex at a location remote from the area where the bristles support the paperboard as it is being cut by said blade.

5. A method of cutting corrugated paperboard comprising using a blade having a serrated cutting edge, rotating said blade about a horizontal axis, using a brush roll having stiff bristles extending generally radially therefrom, rotating said brush roll about an axis so that there is an interference fit between the blade cutting edge and the tips of the bristles on the brush roll, feeding paperboard between the axes, so that the paperboard contacts the tips of the bristles and engages the cutting edge, cutting the paperboard by said blade cutting edge as it passes between said axes, and supporting the paperboard by said bristles due to contact with the paperboard during said cutting step.

References Cited
UNITED STATES PATENTS

| | | | |
|---|---|---|---|
| 417,093 | 12/1889 | Robison | 83—101 |
| 2,142,728 | 1/1939 | Kienzle. | |
| 3,293,962 | 12/1966 | Gianaris | 83—470 |
| 3,338,125 | 8/1967 | Casey | 83—659 X |
| 3,386,323 | 6/1968 | Dovey | 83—659 X |

JAMES M. MEISTER, Primary Examiner

U.S. Cl. X.R.

83—429, 470, 474, 659

UNITED STATES PATENT OFFICE
CERTIFICATE OF CORRECTION

Patent No. 3,508,460　　　　　Dated April 28, 1970

Inventor(s) Walter J. Goettsch

It is certified that error appears in the above-identified patent and that said Letters Patent are hereby corrected as shown below:

Column 1, line 46, the word "not" is inserted before "crushed" so that the terminal portion of line 46 reads as follows:

"The edges are not crushed..."

SIGNED AND
SEALED
OCT 20 1970

(SEAL)
Attest:

Edward M. Fletcher, Jr.
Attesting Officer

WILLIAM E. SCHUYLER, JR.
Commissioner of Patents